H. G. DOELLINGER.
CANDY DIPPING MACHINE.
APPLICATION FILED OCT. 23, 1914.
1,186,557.
Patented June 13, 1916.
5 SHEETS—SHEET 5.
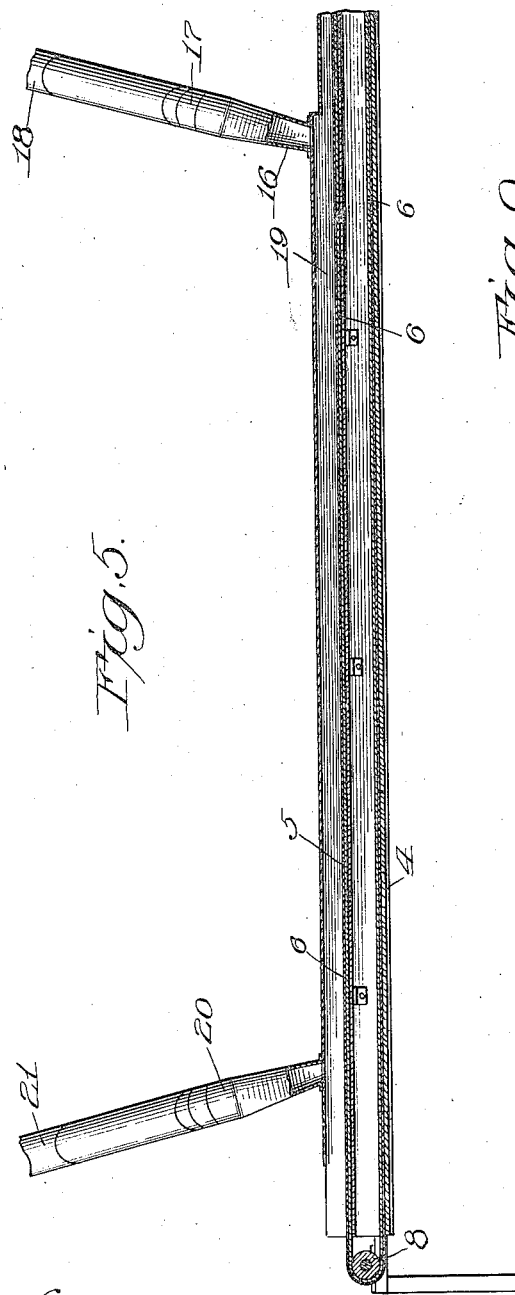
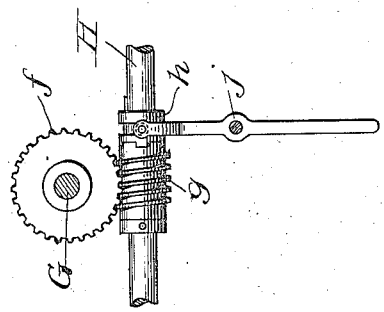
Witnesses:
Harry S. Gaither
Florence Mitchell
Inventor:
Herman G. Doellinger
by Frank E. Thomason
Atty

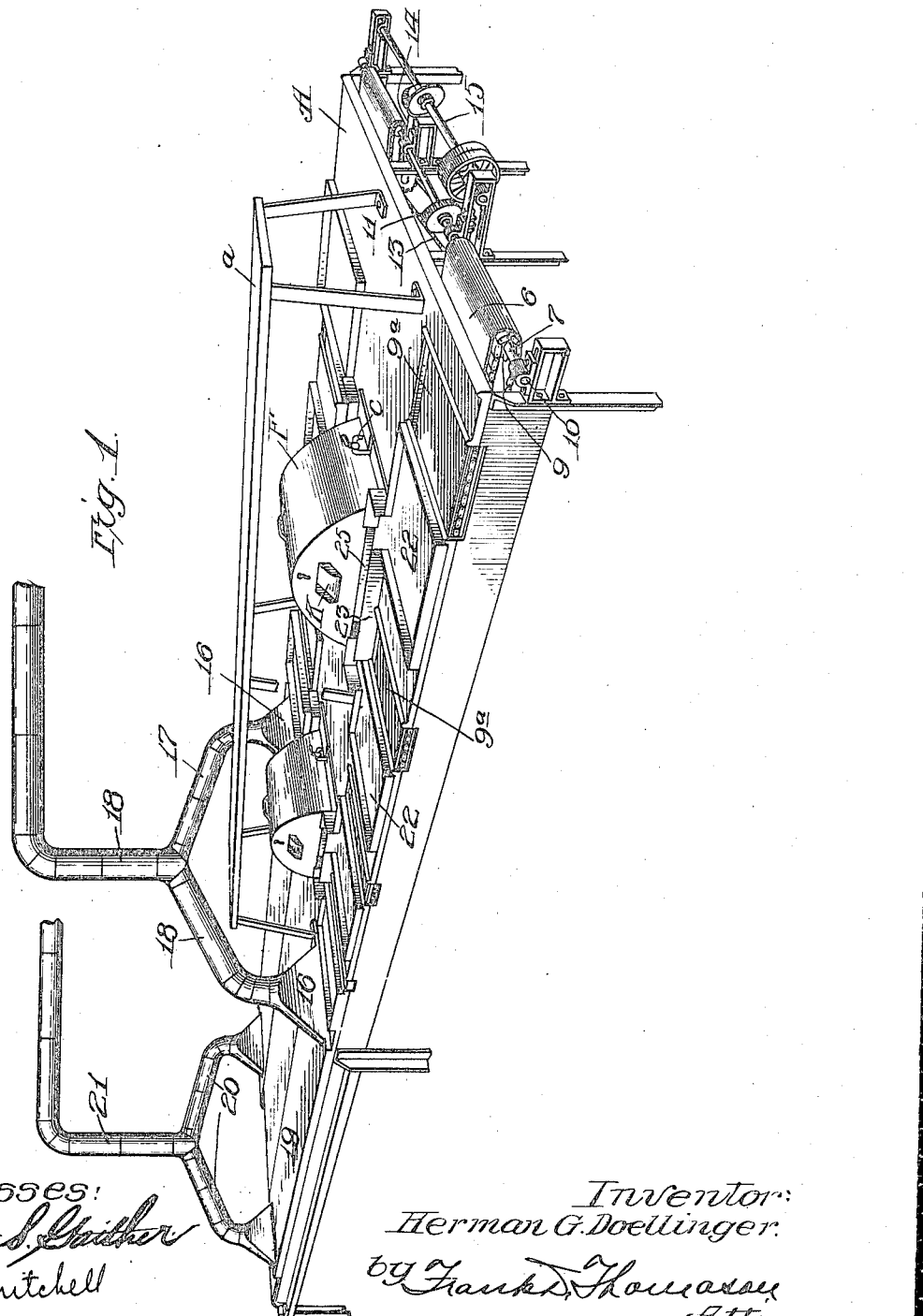

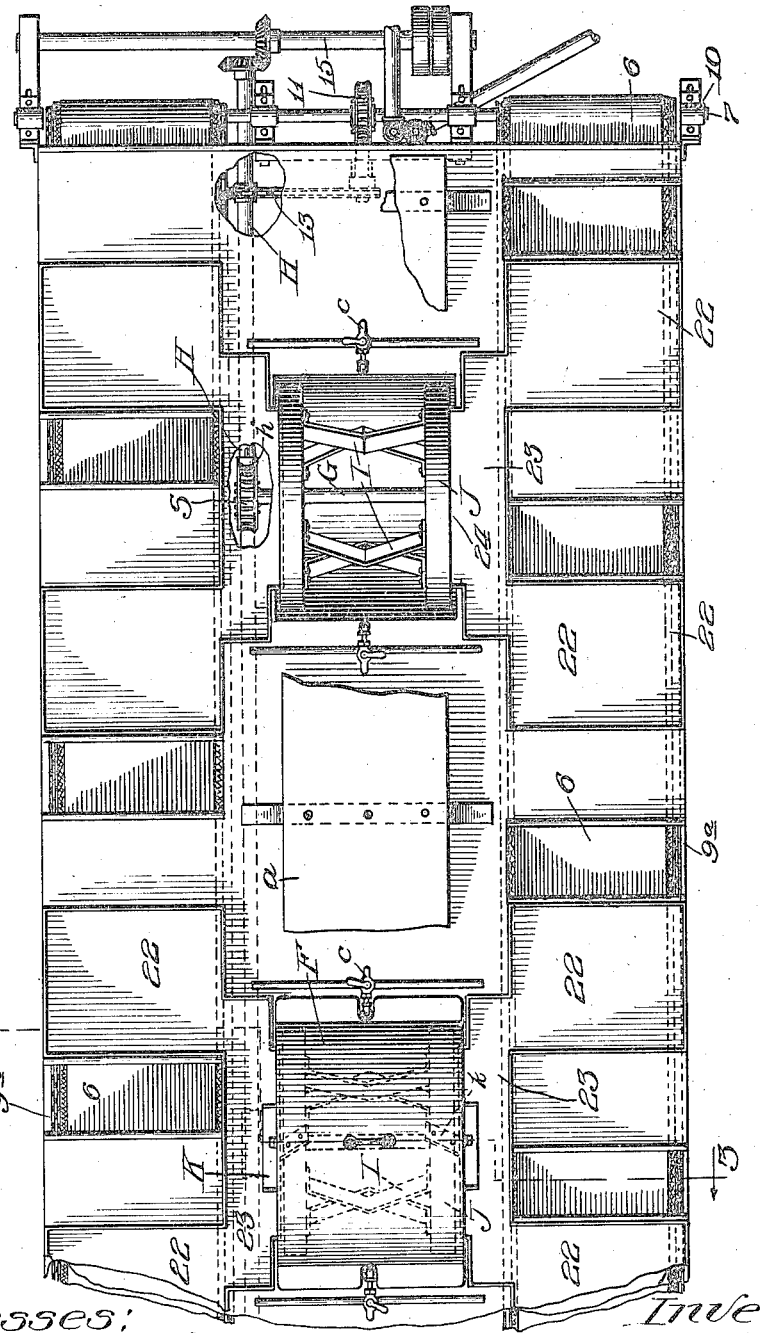

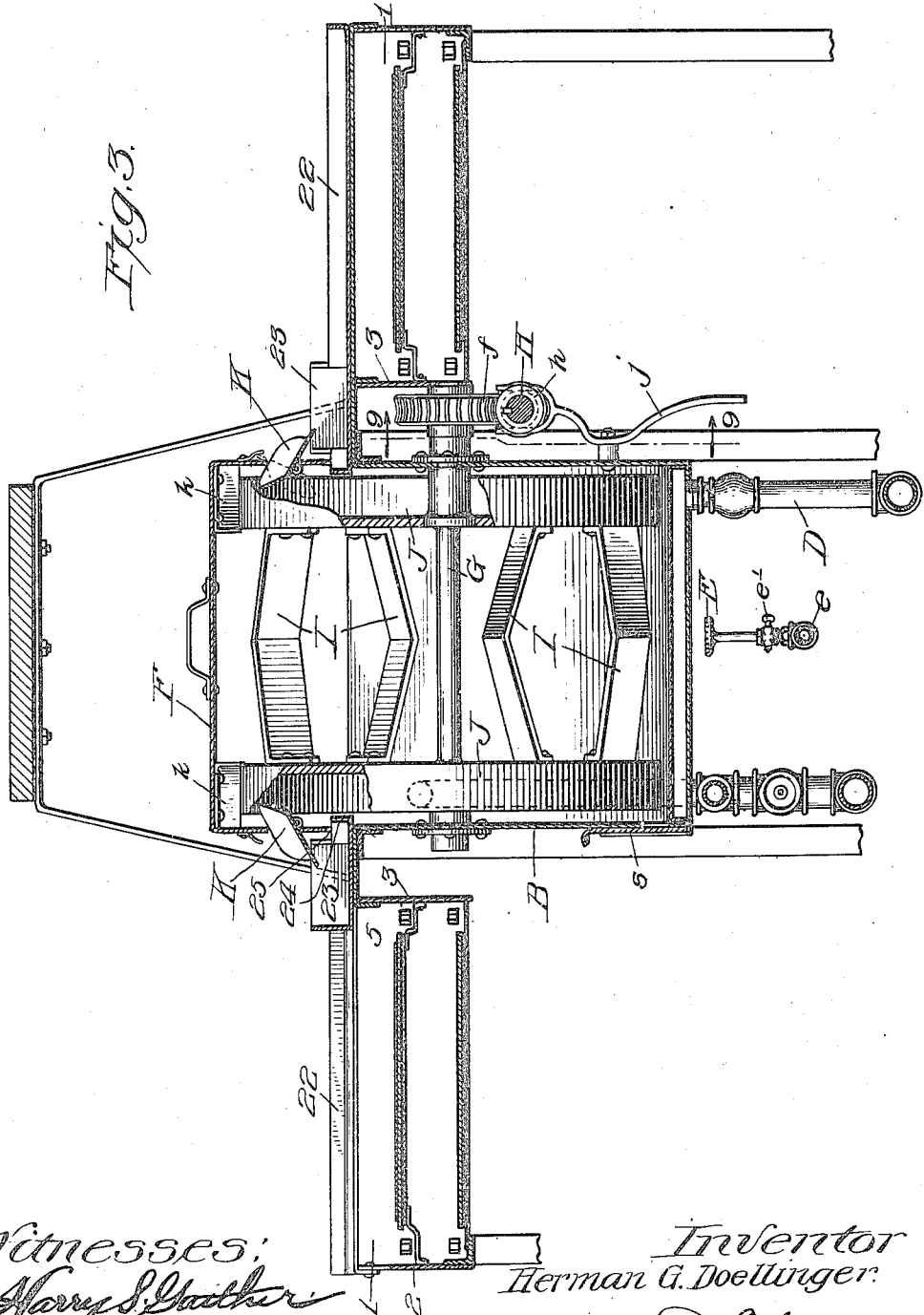

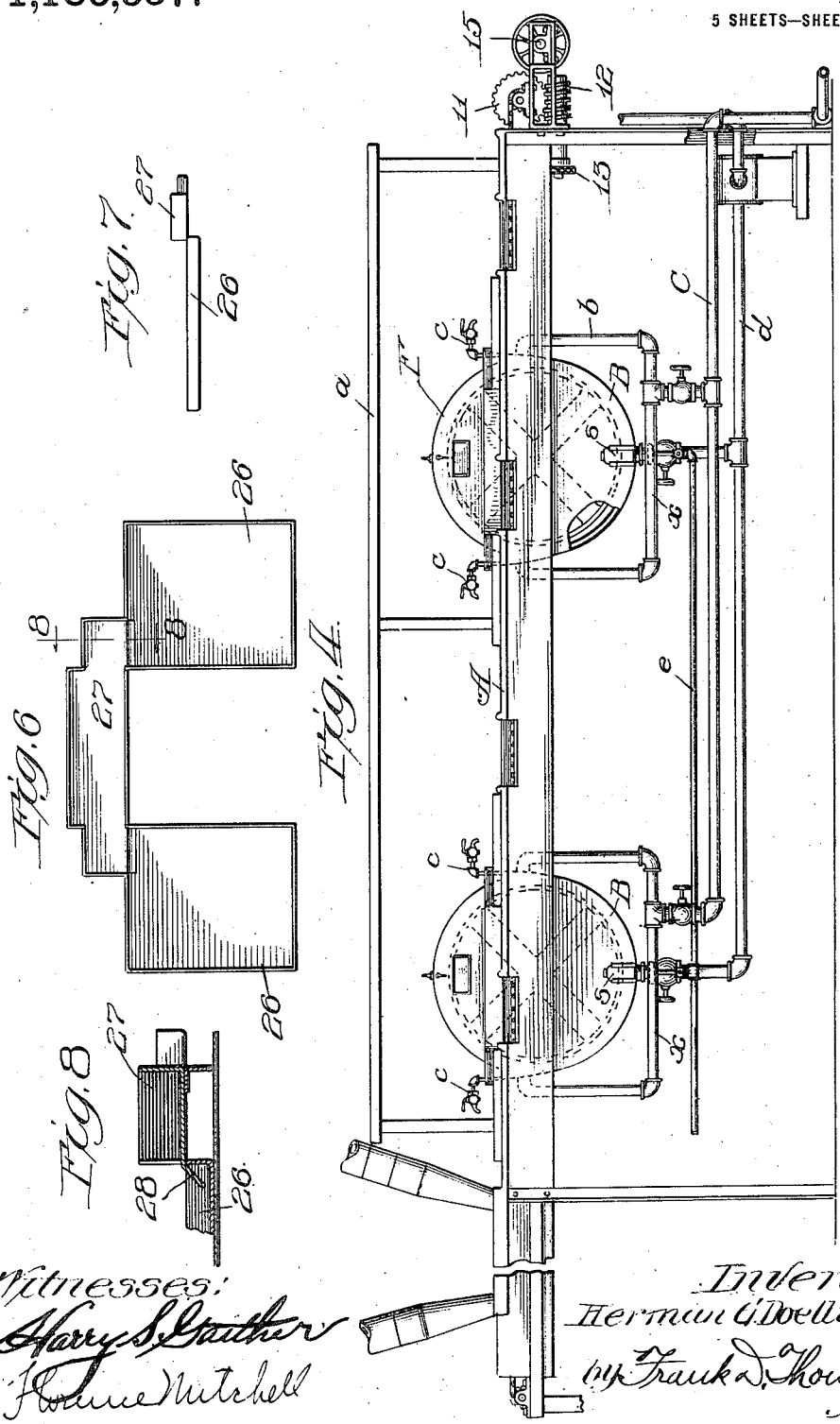

UNITED STATES PATENT OFFICE.

HERMAN G. DOELLINGER, OF DAVENPORT, IOWA.

CANDY-DIPPING MACHINE.

1,186,557.

Specification of Letters Patent.

Patented June 13, 1916.

Application filed October 23, 1914. Serial No. 868,155.

*To all whom it may concern:*

Be it known that I, HERMAN G. DOELLINGER, a citizen of the United States, residing at Davenport, in the county of Scott and State of Iowa, have invented new and useful Improvements in Candy-Dipping Machines, of which the following is a full, clear, and exact description.

My invention relates to candy dipping benches or tables, and more particularly to means for facilitating the work of a gang of operators dipping chocolate creams.

The object of my invention is to provide a machine of this character which enables a number of operators to work on opposite sides of a table-like structure; to obtain the soft chocolate from the revolving member of the mixing and heating vessel without requiring the use of the fingers to scrape the chocolate therefrom; to provide trays which can be easily removed and cleaned and to so construct these that they possess a supply pan separate from the parts of the tray in which the dipping is done; to provide means for conveying the dipped chocolates slowly to and through a cooling chamber in which the chocolate coating is hardened, and to otherwise construct said machine so as to avoid unsanitary conditions and to facilitate the work of the operators, substantially as hereinafter fully described, and as particularly pointed out in the claims.

In the drawings: Figure 1 is a perspective view of the upper part of my invention.
Fig. 2 is a plan view thereof, drawn to a slightly larger scale, of the dipping portion of the machine. Fig. 3 is a transverse section on a still larger scale, taken on dotted line 3—3, Fig. 2. Fig. 4 is a side elevation of my improved machine with a portion of the cooling chamber broken away. Fig. 5 is a longitudinal section of the cooling chamber broken away from the remainder of the machine. Fig. 6 is a plan view of a modified form of said tray. Fig. 7 is an end view thereof. Fig. 8 is a transverse section of a portion thereof taken on dotted line 8—8, Fig. 6. Fig. 9 is a detail view.

Referring to the drawings, A represents the bed or top of a bench or table, which is suitably supported by legs, and has a suitable longitudinal platform *a* supported centrally above it by suitable legs that extends from one end of the machine to a point, pref- erably, beyond its center of length, midway between its sides, substantially as shown in the drawings. Midway between the longitudinal sides of top A it is provided with one or more sunken heating and mixing vessels B in which the chocolate is kept in a melted condition, the body of which consists of an inner and outer metal shell and end-walls of one thickness of metal so as to provide a steam-jacket which is supplied with hot water by suitable valve-controlled pipes *x*, into which latter steam is fed from a longitudinally disposed feed-pipe C. The upper edges of the end-walls of these vessels B and the upper closed ends of the steam-jackets thereof are flanged outward and are supported by and secured to the table, and the closed ends of the water-jackets are provided with faucets *c*. The water from these jackets is drained by pipes D that lead down from the lowermost segment thereof and discharge into a suitable return pipe *d*, and the contents of the vessels may be removed therefrom by the gates *s* in the end-walls thereof, as shown.

If desired, water could be supplied to the interior of said water jackets and heated by means of a suitable gas burner, which latter is supplied with gas from a suitable service pipe *e*. Should this result in too high a temperature to obtain the best results with the chocolate, the flame of the burner can be easily regulated by a valve *e'*, substantially as shown in Fig. 3 of the drawings. These vessels are covered by a segmental cover F the top of which describes a segment of a circle, the radius of which is the same as that of the bottom of vessels B so that when placed over the vessels the two form a substantially cylindrical receptacle the axis of which is transverse.

The end-walls of vessels B are provided with suitable bearings and a transverse shaft G is journaled in these bearings that is driven by a suitable worm-gear *f* thereon and a worm *g* loosely mounted on a longitudinally extending drive-shaft H. The motion of shaft H is transmitted to worm *g* by a longitudinally reciprocable clutch *h*, which latter is splined to shaft H and has a longitudinally reciprocable movement thereon, but revolves therewith. This clutch *h* is moved into and out of engagement with its counterpart in the adjacent end of worm *g* through the medium of a lever *j* whose upper end is bifurcated and has pins in its extremities that enter a circumferential groove in clutch *h*, as shown. Inside of said vessels, next its bearings, shaft G is provided with two flat rimmed wheels J, J, the diameter of which is such that they reach nearly to the bottom of said vessels. These wheels are connected by means of angular mixing blades I, which, when said wheels revolve, stir and mix the chocolate. As the wheels revolve the periphery of their rims receive a veneer or coating of chocolate, and heretofore the candy dippers either used their fingers or a knife blade and scraped the soft chocolate off the upper segment of the rim into a pan placed alongside the vessel in such position as to catch the drippings. I remove this soft coating or chocolate from the periphery of the rim by means of doctors *k* consisting of oblique scraping blades secured to the underside of the tops of the covers F, next the end-walls of the same, which are so disposed as to engage and scrape the chocolate off of the rims. The chocolate drips into chutes K that are channel-shaped, and pivoted through the medium of suitable lugs in openings in the end-walls of the covers so that they can tilt inward or outward to dump the chocolate drippings from the rim of the wheels back into the vessel, when inclined in one direction, or into the receiving-pan of the trays located alongside of the covers, when inclined in the opposite direction.

The top of the table on either side of the vessel B extends in the same horizontal plane as the central portion thereof to the sides of the same, but beneath these side portions I make longitudinal runways 1 that extend the entire length of the table. These runways are inclosed on the outer side by the side rails 2 of the table and on the inner side adjacent vessels B by longitudinal drop-walls 3 secured to and depending from top A. The lower edges of the side-rails and the drop-walls are connected by a suitable bottom plate 4 and said runways are divided into upper and lower passages by a deck 5 comprising a horizontal partition that connects said side-rails 2 and drop-walls 3 the entire length of the table. These passages are designed to accommodate an endless apron or belt that passes around a suitable drive-roller 9 at one end of the machine that is mounted upon a transverse shaft 7, and around a suitable idle-roller 8 at the opposite end of the machine. The upper stretch of this apron is supported by and moves over the deck 5 and the sag of the under-stretch thereof moves over and is supported by the bottom plate of the runway. The filler of the chocolate creams when dipped are placed upon this apron, or rather upon oiled paper placed upon it, and in order to enable the operators to do this, the top A of the table over the upper passage of the runway is cut away or removed at suitable intervals to provide rectangular hatchways or openings 9a down through which the operators can reach to deposit the confections upon the aprons. I prefer to provide the inner and transverse edges of these hatchways with suitable beads and to recess the said rails 2 of the table down as far as the deck 5 for the accommodation of the movements of the hands of the operators.

It is immaterial in so far as the novel features of my invention are concerned what means are employed to revolve shaft 7. This shaft is mounted in longitudinally adjustable bearings 10 supported on suitable brackets to enable the apron to be tightened when necessary, and I prefer to drive said shaft through the medium of a worm-gear 11 secured thereto about its center of length, and a longitudinally disposed worm 12 the shaft of which is driven through the medium of a sprocket and chain 13, which latter is actuated by gearing on shafts H and 15, substantially as shown in the drawings.

The chocolate melting vessels and dipping contrivances, hereinbefore described, occupy about one-half the length of the table. Between the portion of the table devoted to said purposes and the opposite end of the same, the runways are entirely inclosed and form cold air ducts, and at one end of these inclosed portions or ducts the flattened ends 16 of bifurcations 17 of an air exhaust-pipe 18, exhausts the air therefrom, and at the other end thereof cold air is supplied thereto from any suitable means through the medium of pipe 21, and the bifurcations 20, 20, extending from said pipe.

The apron 6 is extended beyond the discharge end of the cold air ducts of the runway, substantially as shown in Fig. 5 of the drawings, and the confections are easily removed from said aprons by an operator seated adjacent thereto.

The trays, hereinbefore referred to, are placed on each side of the mixing-vessels and comprise two corresponding rectangular Siamese platforms 22, 22, of a width corresponding to the width of the runways. These trays are connected by a bridge or receiving-pan 23 which is offset toward the vessels and forms a trough into which the soft chocolate drips from the overhanging chute K before being swept into the dipping-trays. The central portion 24 of the inner longitudinal edge of the receiving-pan 23 is offset toward vessels B, and is designed to enter a horizontally elongated slot 25 in the ends of the covers of said vessels just above the plane of the top of the table. The edges of the receiving-pan and the dipping trays are flanged upward, but where the receiving-pan connects with the trays the flange is omitted so as to leave a gateway through which free communication between the receiving-pan and said trays can be had to enable the operator to sweep such portion of the melted chocolate as may have been received in the pan 23 into the dipping-trays, with the hand. As thus constructed, when trays 22 are placed upon the side of the table with the offset of pan 23 in slot 25 of the cover F, hatchway 9$^a$ will be located to the right of each tray placed on the right side of the table, and to the left of each tray on the left side of the table so as to facilitate the work of the operators.

In Figs. 6, 7 and 8 of the drawings, I show a modification of the trays in which said trays 26 are made separate from the receiving-pan 27. The edges of the tray 26 are provided with unbroken upward flanges and the receiving-pan 27 is constructed substantially similar to pan 23, except that it is separate from said trays and is surrounded on all sides with upwardly projecting flanges, except where it communicates with trays 26. At this point it is provided with a downwardly inclined lip 28 made by an extension of the bottom of the pan, that is adapted to lap over the adjacent flanged edge of the trays.

One or more of the operators can be seated on each side of the table, when my improved machine is in operation, and when it is desired to obtain a sufficient quantity of melted chocolate for dipping purposes, the chutes K in the ends of the covers F are inclined outward and discharge the chocolate dripping from the periphery of the wheels J onto the receiving-pan 23. When a sufficient quantity of the melted chocolate is accumulated on this pan, the operator sweeps it onto the tray 22 and then takes the hardened cream or candy filler from a box conveniently placed in front of him on the table and dips the same in the soft chocolate in said trays. He then deposits the dipped candy on the endless apron 6 by which the candy is slowly conveyed to the discharge end of the runways. As the dipped candy reaches the inclosed part of the runways 1 it enters and passes through the cold air ducts thereof and is subjected to a current of cool air, and by the time it has reached the discharge end of the machine, the chocolate or other coating in which it is enveloped is hardened, and the candy is removed from the apron and deposited in boxes by an operator seated at the end of a table for that purpose.

What I claim as new is:—

1. A machine of the kind specified comprising a suitable table, a confection coating melting and mixing vessel supported thereby, a longitudinal runway alongside of said vessel having openings in its top, endless aprons therein, removable trays on said table adapted to receive melted confection from said vessel and located adjacent said opening, and means for supplying melted confection from said vessel to said trays.

2. A machine of the kind specified comprising a suitable table, a melting and mixing vessel supported by said table mediate the longitudinal sides thereof, longitudinal run-ways on each side of said vessel having openings in the top thereof, endless aprons moving longitudinally through said runways, removable trays alongside said vessels and adjacent said openings and means for supplying melted confection from said vessel to said trays.

3. A machine of the kind specified comprising a suitable table, a melting vessel supported thereby, a rotatable mixing-wheel in said vessel, a cover for said vessel, automatic means for scraping the periphery of said wheel, devices for discharging the scrapings of said wheel outside said cover, a removable tray adapted to receive said scrapings, and a longitudinally movable apron within convenient reach of said tray.

4. A machine of the kind specified comprising a suitable table, a melting vessel supported thereby, a rotatable mixing-wheel in said vessel, a cover for said vessel, obliquely disposed blades depending from the inside of the top of said cover for scraping the periphery of said wheel, devices for discharging the scrapings of said wheel outside said cover, a removable tray adapted to receive said scrapings, and a longitudinally movable apron within convenient reach of said tray.

5. A machine of the kind specified comprising a suitable table, a melting vessel supported thereby, a rotatable mixing wheel in said vessel, a cover for said vessel, automatic means for scraping the periphery of said wheel, a laterally tiltable chute pivoted in a suitable opening in the sides of the cover for discharging the scrapings of said wheel either inside or outside said cover, a removable tray adapted to receive said scrapings, and a longitudinally movable apron within convenient reach of said tray.

6. A machine of the kind specified comprising a suitable table, a melting vessel supported thereby, a rotatable mixing wheel in said vessel, a cover for said vessel, automatic means for scraping the periphery of said wheel, a laterally tiltable chute pivoted in a suitable opening in the sides of the cover for discharging the scrapings of said wheel either inside or outside said cover, a removable tray one edge of which is adapted to enter a suitable opening in the adjacent side of said cover below said chute adapted to receive said scrapings, and a longitudinally movable apron within convenient reach of said tray.

7. A machine of the kind specified comprising a suitable table, a suitable melting and mixing vessel supported thereby, a longitudinal runway extending alongside of said vessel and having openings in the top thereof adjacent said vessel, and having the discharge end portion of its length entirely inclosed, cool air inlet and outlet pipes communicating respectively with the ends of the inclosed portion of the runway, removable trays on said table adjacent said vessel and said openings and means for supplying melted confection from said vessel to said trays.

8. A machine of the kind specified comprising a suitable table, a confection coating melting and mixing vessel supported thereby, a longitudinal runway alongside of said vessel having openings in its top, endless aprons therein, removable trays having two separated sections and connecting portion on said table adapted to receive melted confection from said vessel and located adjacent said opening, and means for supplying melted confection from said vessel to said trays.

9. A machine of the kind specified comprising a suitable table, a confection coating melting and mixing vessel supported thereby, a longitudinal runway alongside of said vessel having openings in its top, endless aprons therein, removable trays having two sections and a transverse portion connecting and integral with said sections on said table adapted to receive melted confection from said vessel and located adjacent said opening, and means for supplying melted confection from said vessel to said trays.

10. In a machine of the class described, a table, a confection vessel supported by said table, means for heating said vessel, a mixing-wheel revoluble in said vessel, a removable tray on said table at one side of said confection vessel, and means for supplying melted confection from the wheel in said vessel to said tray.

11. In a machine of the class described, a table, a confection vessel supported by said table, means for heating said vessel, a mixing-wheel in said vessel, a removable tray on said table at one side of said confection vessel, and means for supplying melted confection from the wheel in said vessel to said tray; said tray having a plurality of sections and a transverse portion connecting said sections.

12. In a machine of the class described, a table, a confection vessel supported by said table, a mixing-wheel revoluble in said vessel, means for heating said vessel, a series of trays on said table on one side of said vessel, and means for supplying confection from the wheel in said vessel to said trays.

13. In a machine of the class described, a table, a confection vessel supported by said table, a mixing-wheel revoluble in said vessel, means for heating said vessel, a series of trays on said table on one side of said vessel, means for supplying melted confection from the wheel in said vessel to said trays, and means for cooling said confection on said trays.

14. In a machine of the class described, a table, a confection vessel centrally supported by said table, a mixing-wheel revoluble in said vessel, means for heating said vessel, a series of trays arranged in longitudinal rows on each side of the confection vessel, and means for supplying melted confection from the wheel in said vessel to both rows of trays.

In witness whereof I have hereunto set my hand this 31st day of July, 1914.

HERMAN G. DOELLINGER.

Witnesses:
PHIL DAUM,
J. L. TRAXLER.